June 6, 1939. T. W. VICKERS 2,161,441
WARNING SIGNAL FOR BRAKING SYSTEMS
Filed July 27, 1936
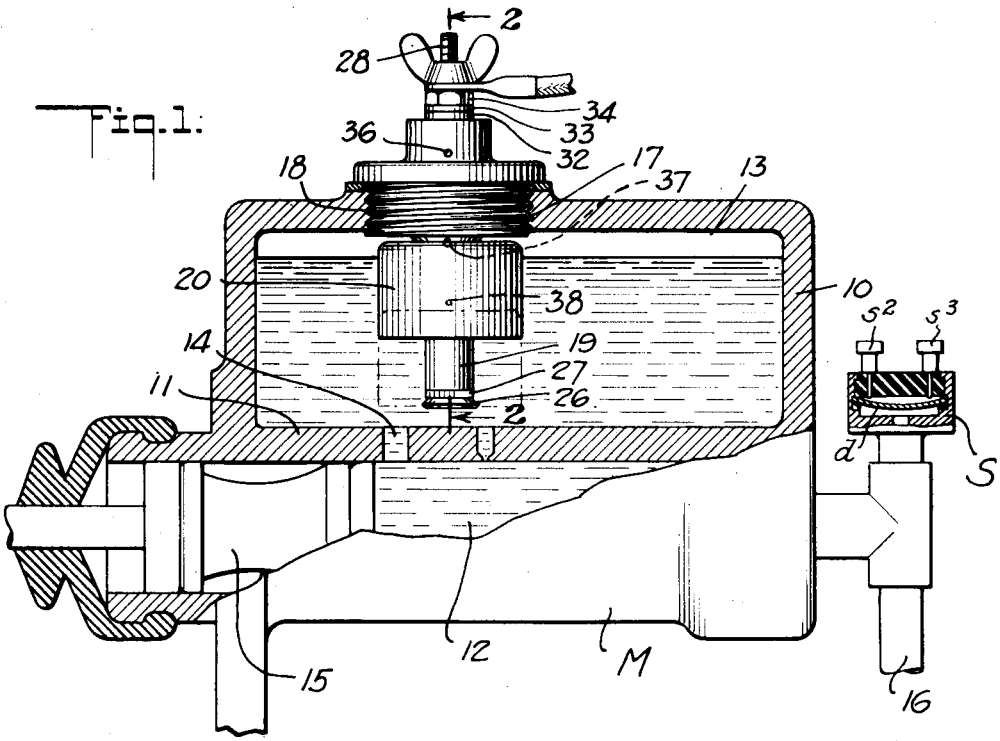
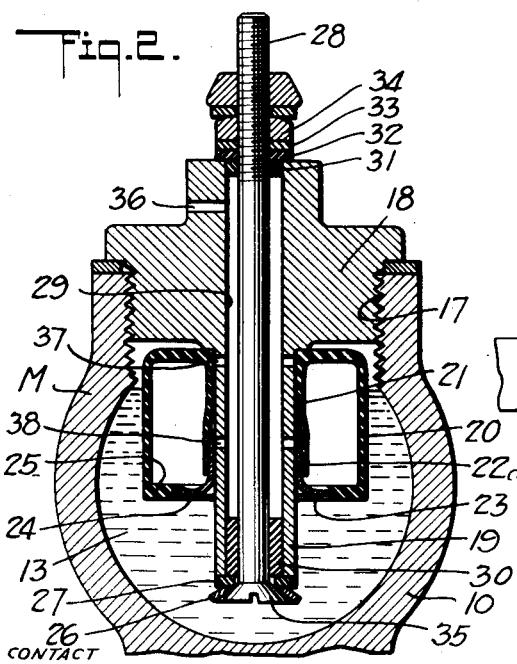
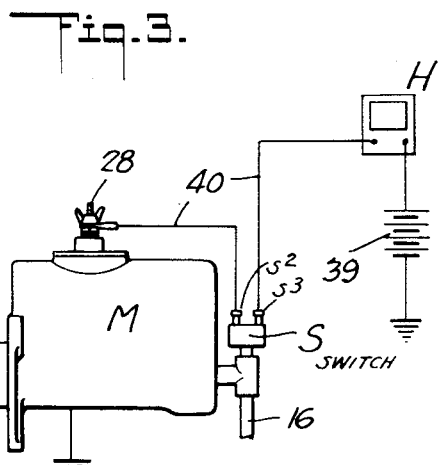
INVENTOR
THEODORE W. VICKERS
BY
Munn, Anderson & Liddy
ATTORNEYS Patented June 6, 1939

2,161,441

UNITED STATES PATENT OFFICE 2,161,441

WARNING SIGNAL FOR BRAKING SYSTEMS

Theodore W. Vickers, Los Angeles, Calif.

Application July 27, 1936, Serial No. 92,746

5 Claims. (Cl. 177—311)

This invention relates generally to hydraulically operated braking systems of the type employed on vehicles.

In hydraulically operated braking systems now in general use, there is provided a master cylinder adapted to contain a supply of a special brake fluid through the medium of which the brakes of the vehicle are operated. Loss of fluid from the master cylinder occurs from several causes with the attendant failure of the braking system and a possible serious accident from loss of control of the vehicle.

An object of this invention is to provide a device which, in its association with the master cylinder of a hydraulically operated braking system functions automatically to warn the operator when the level of the brake fluid in the master cylinder has been lowered to a predetermined safe level as a result of loss of fluid, so that the necessary replenishment of fluid can be made before the lack of fluid causes failure of the braking system.

Another object of the invention is to provide a device of the above described character by which the operator will be warned in the event that impure fluid has been supplied to the master cylinder so that its removal can be effected before the braking system is damaged.

With these and other objects in view, the invention consists in the combination and arrangements of elements set forth in the following specification and particularly pointed out in the appended claims.

In the accompanying drawing,

Figure 1 is a view partly in elevation and partly in vertical longitudinal section of a master cylinder with one form of warning signal embodying this invention associated therewith;

Figure 2 is an enlarged transverse sectional view taken on the line 2—2 of Figure 1;

Figure 3 is a diagrammatic view of an electrical circuit with which the invention is electrically associated.

Referring specifically to the drawing, the invention in its present embodiment is shown associated with a master cylinder M of a hydraulically operated braking system. This master cylinder comprises a body 10 divided interiorly by a horizontal partition 11 into a working cylinder 12 and a fluid reservoir 13 from which fluid is free to flow into the cylinder 12 through a port 14 in the partition 11. A piston 15 works in the cylinder 12 and is manually operated to apply pressure to the fluid so that the latter can function through the usual fluid line 16 to apply the brakes as will be clearly understood by those skilled in the art.

The reservoir 13 is provided with a threaded filling opening 17 to which an air vented plug (not shown) is normally applied. However, in the use of this invention the aforestated plug is removed, and a plug 18 substituted therefor to close the opening 17.

The plug 18 broadly constitutes a support or mounting for a fluid level responsive switch and is provided axially with a depending stem 19 on which is freely mounted to respond to changes in fluid level in the reservoir 13 a float 20 constituting a movable contact of said switch.

The float 20 is in the form of a hollow cylinder preferably of ordinary elastic rubber as used for the rubber packing cup of the master piston 15 and other rubber parts of the braking system and having a re-entrant sleeve 21 (Figure 2) at its upper end freely receiving the stem 19 and embracing a metallic contact in the form of a sleeve 22 slidably mounted on the stem and having an outwardly projecting radial flange 23 the peripheral portion of which is snugly received in an annular groove 24 formed in a flange 25 projecting radially inward from the lower end of the float 20.

The contact 22 and the float are thus detachably secured together with a fluid sealed joint between the two provided by the inter-engaging flanges 23 and 25, so that fluid in the reservoir cannot normally enter the float and affect the buoyancy thereof.

Co-acting with the movable contact 22 is a fixed contact 26 in the form of a metal disk insulated from the stem 19 by a washer 27 of insulating material, with both the contact 26 and the washer receiving a binding post screw 28 passing freely through a longitudinal bore 29 extending through the plug 18 and its stem 19. The screw 28 is insulated from the stem 19 by rubber bushings 30 and 31 and a rubber washer 32 with which latter co-acts a metal washer 33 and a nut 34 threaded on the upper end of the screw which projects from the plug 18. The fixed contact 26, which also functions as a stop to prevent loss of the float from the stem 19 when the plug 18 is unscrewed from the opening 17, is confined on the screw 28 by the head 35 thereof so that when the nut 34 is tightened the contact 26 will be immovably secured on and insulated from the stem at the lower end thereof and in the path of downward movement of the movable contact 22 carried by the float 20.

As the reservoir must be vented to the atmosphere to permit the necessary displacement of fluid during operation of the piston 15, the plug 18 and stem 19 are provided, respectively, with ports 36 and 37 in communication with the bore 29. Below the port 37, the stem is provided with a second port 38 which functions to permit oil accumulating in the bore 29 to drain therefrom rather than be pumped out of the port 36 with air during operation of the piston 15.

As shown in Figure 3, the contacts 22 and 26 are adapted to be included in an electrical circuit including the battery 39 of the vehicle as a source of supply, one side of which is grounded as is the master cylinder M. Current from the battery 39 is supplied to the fixed contact 26 by a conductor 40 leading to the binding post screw 28, through an interposed conventional type of fluid pressure responsive diaphragm switch S which is embodied in the fluid line 16 at any suitable point so as to be exposed to and be closed by the fluid when the pressure is applied thereto from the piston 15 during a braking operation. The switch S is also in circuit with the horn H or other desired audible or visual signal on the vehicle, and is employed in the event that it is desired to activate the signal only upon a brake application should the fluid in the reservoir 13 have been lowered to a predetermined minimum level at which the circuit is closed through the contacts 22 and 26. As shown in Figure 1, the switch S includes a flexible metallic diaphragm d exposed on one side to fluid in the line 16 and normally out of engagement with insulated contacts s2 and s3. The diaphragm responds to pressure upon the fluid in the line 16 by flexing into engagement with the contacts s2 and s3, to thus bridge the latter and complete the circuit therethrough. Switches of this type are commonly provided in hydraulic braking systems of automobiles for closing the circuit to a stop light of the vehicle when the brakes are applied.

The operation of the invention is as follows:

Let it be assumed that a brake fluid such as those disclosed in U. S. Patents Nos. 1,525,942 and 1,891,962 is supplied to the reservoir 13 and is at a relatively high level as shown in Figure 1, so that the float 20 is buoyed up by the fluid to a height at which the contact 22 is disengaged from the contact 26. A brake application under this condition will produce no signal, as although the circuit will be completed through the switch S so long as the brake application is maintained, the circuit is disrupted at the contacts 22 and 26.

However, should the level of fluid in the reservoir lower to a point predetermined as the minimum for safety, the float 20 will accordingly lower to engage its contact 22 with the contact 26. Upon a brake application, the circuit will now be complete to sound the horn H and thus warn the operator that the fluid in the reservoir should be replenished and the braking system inspected and overhauled.

In the event that kerosene, gasoline or other mineral oil or other liquid more injurious to rubber than proper brake fluid is used in the master cylinder instead of or added to the proper fluid, the rubber float 20 will be much more rapidly deteriorated and will soon be caused to bloom or swell so as to expand sufficiently to unseal its flange 25 from the flange 23 of the movable contact 22, and free the latter so as to permit it to gravitate on the stem 19 into engagement with the contact 26, thus sounding the signal upon a brake application notwithstanding the fact that the fluid is at a high level in the reservoir.

It has also been found in practice that the action of certain impurities in various fluids sold for hydraulic braking systems, causes the relatively thin peripheral wall of the float to be eaten through before other working rubber parts in the system are rendered functionally defective by the impure fluid. Under this condition, sufficient liquid can enter the float to cause the latter to settle and engage the contact 22 with the contact 26. Furthermore, the agitation of the fluid in the reservoir as a result of applications of the brakes, will force air out of, and liquid into the float, if unsealed from the flange 23 of the contact 22, or if the wall of the float has been dissolved at any other place by the action of impure liquid, thus increasing the weight of the float sufficiently for it to settle in the reservoir and engage the contacts 22 and 26.

It will be understood that as the peripheral wall of the float is extremely thin in comparison to the rubber packing cup of the master piston 15 as well as to all other rubber working parts in the system, that the float will be the first element to be rendered functionally defective by impure liquid, so that a warning will be given by the device before there is sufficient damage to the other rubber working parts of the system to result in failure of the brakes by leakage of liquid past the rubber working parts.

What is claimed is:

1. An actuating float device responsive to low liquid level or impure liquid comprising a hollow float; means mounting the float in a fluid chamber to respond to variations in liquid level; and means coacting with the float to seal the latter against the ingress of liquid, and to unseal the float should the latter become deformed by the action of an impure liquid thereon.

2. An actuating float device responsive to low liquid level or impure liquid comprising a hollow float of elastic rubber having an inwardly projecting annular flange; means mounting the float in a fluid chamber to respond to variations in fluid level; and a member on the first means having an outwardly projecting annular flange in interfitting sealing engagement with the float flange, and from which the latter will become unsealed upon deformation of the float by impure fluid.

3. An actuating float device responsive to low liquid level or impure liquid and adapted for use in a braking system embodying rubber working parts exposed to the action of the liquid, comprising a hollow float of elastic rubber sealed against the ingress of liquid; the float having a wall which is thin relative to the walls of said rubber working parts so as to be eroded through by an impure liquid and thus be unsealed, prior to sufficient damage by the impure liquid to the other working parts as would cause defective functioning thereof.

4. An actuating float device responsive to low liquid level or impure liquid comprising a hollow elastic rubber float having a central opening therethrough; a metallic sleeve in said opening; and means co-acting with said float and sleeve to seal the float against the ingress of fluid.

5. An actuating float device responsive to low liquid level or impure liquid comprising a hollow elastic rubber float having a sleeve defining an opening through the float; a metallic sleeve in said opening, having sealing engagement with the float sleeve; and flanges on the float and metallic sleeve co-acting to seal the float against the ingress of fluid.

THEODORE W. VICKERS.